May 2, 1939.  L. WOHINC  2,156,613
MEANS AND METHOD OF MAKING GLASSWARE
Filed March 17, 1937   2 Sheets-Sheet 1
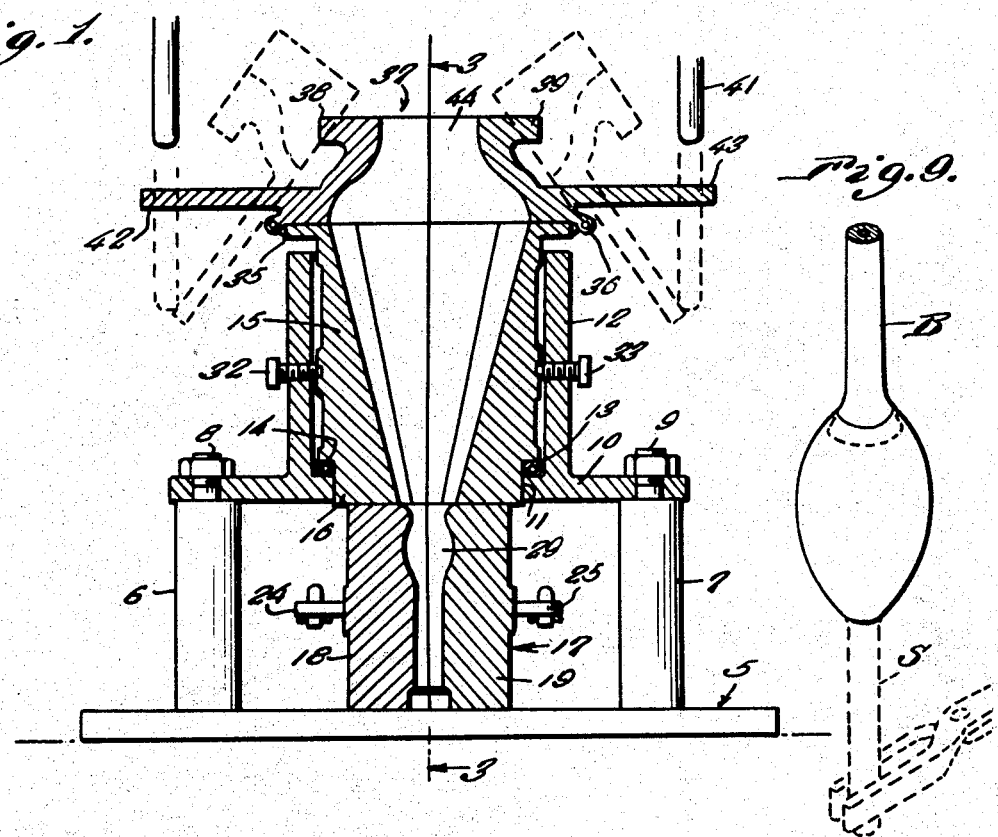
Fig. 1.
Fig. 9.
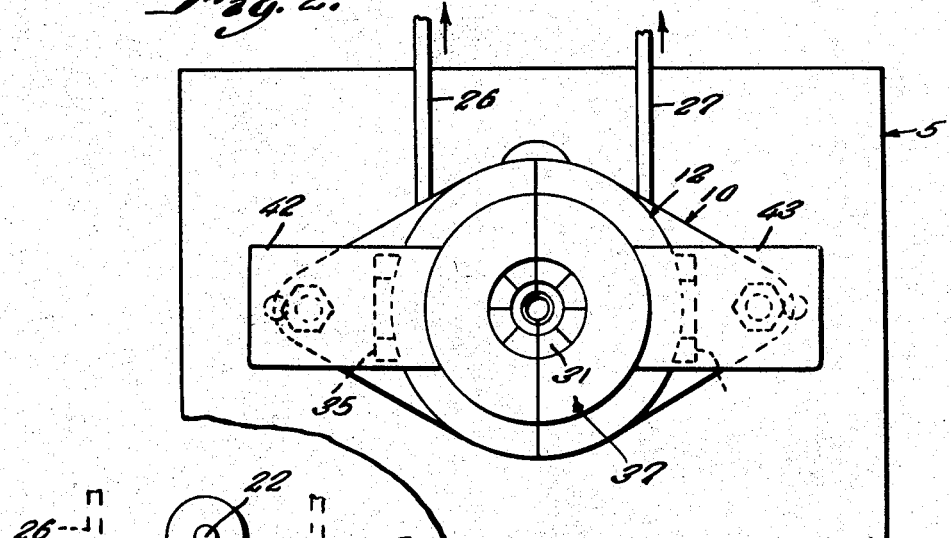
Fig. 2.
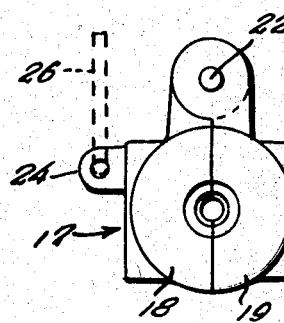
Fig. 8.
Inventor
Louie Wohinc
By L. Edw. Doherty
Attorney May 2, 1939.  L. WOHINC  2,156,613
MEANS AND METHOD OF MAKING GLASSWARE
Filed March 17, 1937    2 Sheets-Sheet 2

Inventor
Louie Wohinc
By L. Edw. Flaherty
Attorney

Patented May 2, 1939

2,156,613

UNITED STATES PATENT OFFICE 2,156,613

MEANS AND METHOD FOR MAKING GLASS-WARE

Louie Wohinc, Weston, W. Va.

Application March 17, 1937, Serial No. 131,512

3 Claims. (Cl. 49—18)

My invention relates generally to moulds, and particularly to a mould adapted to the forming of glassware and the like by mechanical operations, and more specifically to apparatus of this class employed in forming thin-walled stem ware by combined blowing and moulding; and my invention further relates to a method of forming such glassware employing such apparatus; and an important object of my invention is to provide means of the character indicated whereby the expenses and difficulties of manufacture are reduced and wherein a greater variety of shapes and sizes of glassware may be formed on the same apparatus.

Stemmed glassware having round bowls regular in shape have been manufactured in one piece. However, when it is desired to produce a stemmed glass having a bowl of octagonal or other irregular shape or provided with design thereon the bowl and stem are separately moulded and subsequently secured together. This has been necessary inasmuch as the manufacturing or moulding of stemmed glassware having bowls of regular shape permits of the contacting of the molten glass with the sides of the bowl mould during the formation of the stem without affecting or causing an injury to the bowl portion of the glass. Heretofore it has been impossible to mould a bowl of irregular shape and a stem in one piece because the irregular surface of the bowl mould would not permit of the rotation of the glass during the formation of the stem, the contacting of the glass with the irregular surface of the bowl mould causing a defect in the completed bowl.

It is, therefore, one of the objects of the present invention to provide a mould which will permit of the moulding of the stemmed glass having a bowl of irregular shape or with designs thereon in one piece.

A still further important object of the invention will be found to reside not only in this novel structure for producing this result, but in a simplified structure which will permit by a simple operation the formation of different types or shapes of bowls.

Other important objects of my invention will be apparent from a reading of the following description taken in connection with the drawings wherein for purposes of illustration I have shown a preferred embodiment of my invention.

In the drawings:

Figure 1 is a general vertical sectional view taken through an embodiment of the invention and showing the sections of the head of the blow-head in open positions in dotted lines.

Figure 2 is a top plan view of the device shown in Figure 1.

Figure 8 is an elevational view showing the stem mould sections in closed positions, and Figure 9 is a perspective view of a portion of the blowpipe and a quantity of glass thereon from which the stem is formed illustrating the manner in which the free end is drawn for forming the stem thereof.

Figure 3:
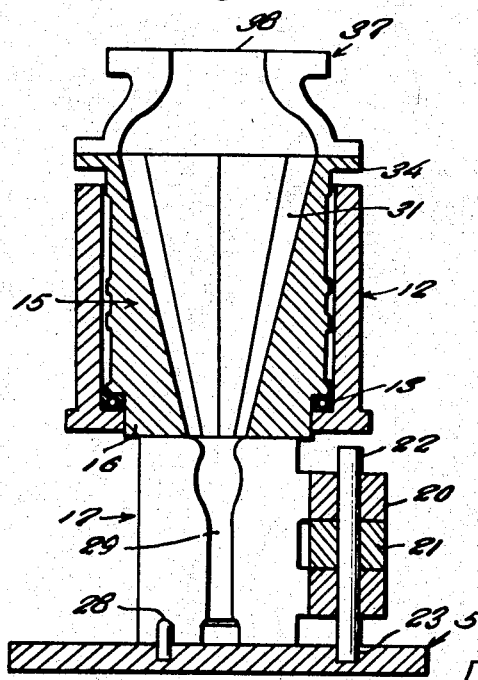
Figure 3 is a vertical sectional view taken through Figure 1 approximately on the line 3—3 and looking toward the left in the direction of the arrows.
Figure 4:
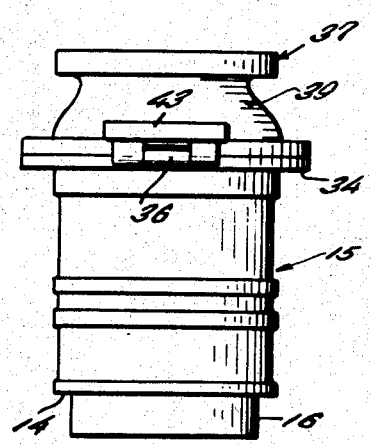
Figure 4 is a side elevational view of the blow-head.

The means for making glassware of the thin-wall stem equipped type having an irregular shape bowl or design therein contemplates the provision of a support on which there is pivotally mounted a sectional stem forming mould. Within the support there is freely rotatable the bowl or body mould for forming the bowl of irregular shape, said bowl mould being in communication with the stem mould. The operator in the usual manner obtains a sufficient quantity of molten glass on the free end of his blowpipe and by means of an instrument such as pinchers or the like draws the free end of the glass into an elongated form approximating the length and cross-sectional diameter of the stem to be formed. The blower then places the glass within the mould, the elongated formation being inserted within the stem mould and upon a subsequent rotation of the blowing pipe the glass assumes the shape of the stem mould thereby forming the stem. The bowl mould being freely and easily rotatable rotates through the contacting of the glass therewith during the formation of the stem and upon a subsequent blowing the bowl is formed of irregular shape without defects.

Referring in detail to the drawings, the numeral 5 generally designates a suitable base such as the table of the machine of which several types are available in the prior art, and from which rise the pedestals 6 and 7 which have mounted on the upper ends thereof by means of bolts 8 and 9 the plate 10 which has a central opening 11 and the generally cylindrical shell 12 rising around and concentrically outwardly spaced from the opening 11 as clearly shown in Figure 1 of the drawings. On the ledge defined by the opening 11 and the shell 12 is arranged a ball bearing structure 13 on which rests the shoulder 14 of the body mould which is generally designated 15 and which is cylindrical in form and has a reduced cylindrical portion 16 of which the lower end depends below the bearing structure 13 and rides closely in the opening 11 in the support plate 10, and close to the top of the stem mould which is generally designated 17 and which rests on the base 5 below the plate 10.

Figure 5:
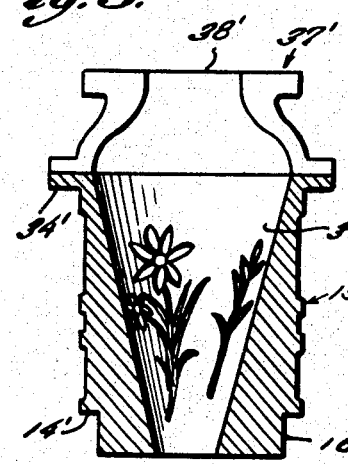
Figure 5 is a vertical sectional view taken through a blow-head having anterior surfaces different from the interior surfaces of the blow-head shown in Figures 1 and 3.
Figure 6:
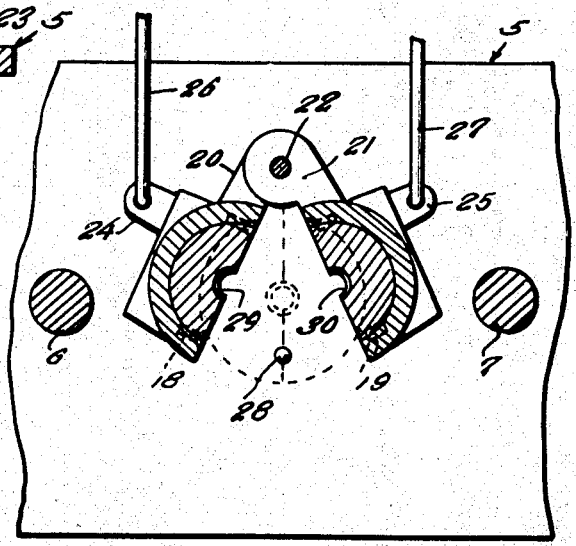
Figure 6 is a horizontal sectional view taken through the lower part of Figure 1 and looking downwardly in the direction of the arrows and showing the sections of the stem mould in open positions.
Figure 7:
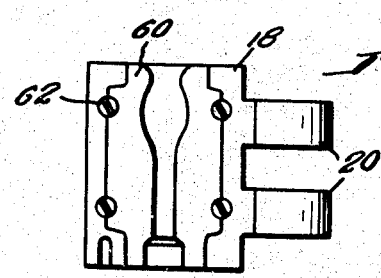
Figure 7 is a front elevational view of one section of the stem mould showing a modified construction thereof.

The stem mould 17 is formed of semi-cylindrical half-sections 18 and 19 as indicated in Figures 6 and 7, each section having an ear 20, 21, respectively, turning on a common pivot 22 which is fastened to the base 5 as indicated by the numeral 23 in Figure 3. Lugs 24, 25, respectively, have respective operating elements 26, 27 pivotally connected thereto, the same operating elements 26 and 27 extending to the automatic machine which operates the device. A guide and stop peg 28 is placed to rise from the base 5 in such a position that it will stop the stem mould sections in their proper closed positions, wherein their opposing semi-bores 29, 30 form the moulds for the stem of the glassware. The upper end or mouth of the stem mould 17 is in the registering positions with the stem mould and the body mould 15, coincidental with the lower end of the bore of the body mould as indicated in Figures 1 and 3. The interior surfaces of the bore 31 are of the external shape desired for the bowl portion of the glassware, and any suitable and desired variations, one of which is shown in Figure 5, in the contour and shape of the bore 31 may be arranged to produce glassware of different shapes and sizes and designs.

With the body mould 15 resting on the bearing arrangement 13, the body mould is rotatably mounted within the shell 12 and vertical movement thereof is normally prevented by means of the set screws 32, 33 which extend into the channel in the mould. Of course when it is desired to remove or place another bowl mould in the shell the set screws are screwed outwardly.

Above the shell 12 the body mould has a laterally extending flange 34 on diametrically opposite points which are hinged as indicated by the respective numerals 35 and 36, the sections 38 and 39 forming the head which is generally designated 37, the hinging being arranged so that these sections may be swung to the dotted line positions shown in Figure 1 for removing the completed glassware or for other operations requiring access to the interior of the body mould. Operating elements 40 and 41 extending from the actuating machine engage elongated lugs 42, 43, respectively, which are formed on the sections. The sections define an inverted funnel-shaped passage 44 through which the glass on the blow pipe is inserted.

From what has been said above it is obvious that it is an easy and simple operation to adjust or change the position of the body mould, and equally easy to entirely change the body mould when it is desired to form glassware of a different shape or contour or design and having the same stem conformation. Although the stem mould 17 cannot be interchanged with as great facility as the body mould, this also is subject to change to suit different bowl forms.

As illustrated in Figures 6 and 7 if so desired, the stem mould sections 18 and 19 may be of semi-circular shape and have inserted therein a die 60 constructed of carbon or other suitable material. This die 60 is securely fastened in the mould ring 18 by means of the screws 62.

In moulding thin glassware the operator as clearly illustrated in Figure 9 in the well known manner obtains a sufficient quantity of the molten glass on the free end of the blow pipe B and subsequently by means of a pair of tongs or the like forms an elongated portion on the free end thereof. In practice the length, and cross sectional area of the elongated portion F depends of course, upon the size stem desired which is controlled by the stem mould 17. The heads are then opened to the position illustrated in dotted lines in Figure 1, the molten material being inserted within the body mould and the elongated portion F into the stem mould. The stem is then formed by rotating the blow pipe B, that portion of the molten glass which will subsequently form the bowl of the glassware contacting the inner side of the rotatable bowl and effecting rotation of the mould thereof. It is to be observed that the rotation of the blow pipe being incident to the formation of the stem and the contacting of the material subsequently forming the bowl of the mould with the bowl or body mould will not cause a defect in the completed body portion of the bowl because of the rotation of the body mould therewith. In other words, the glass which is subsequently to be blown for forming the bowl of the glassware instead of rubbing against the inner side of the mould as would be the case if the same were stationary and causing a subsequent defect, due to the rotatable mounting of the mould effects a simultaneous rotation of the mould with the molten glass thereby eliminating the sliding contacting of the glass therewith and any defects which might be caused by this sliding contacting. After the stem has been formed in this manner, the bowl of the glassware is blown in the usual manner, and upon the opening of the blow-heads, and the stem mould section the completed glass may be entirely removed from the mould.

It will thus be seen that the rotatable mounting of the bowl or body mould permits of the formation of the stem portion of the glassware through the medium of rolling the blow pipe and effects a simultaneous rotation of the bowl mould with the glass permitting of the moulding of a bowl of irregular shape integral with the stem portion of the glassware free from any defects. Obviously, the bowl may be of any configuration or shape, have any type of design thereon or be provided with surface inequality, the simultaneous rotation of the bowl moulds with the molten glass during the formation of the stem eliminating the usual defects caused by the rubbing or contacting of the glass with the interior of the body or bowl mould.

While there is shown for the purpose of illustration the preferred embodiment of the invention, it is to be understood that it is capable of various changes without departing from the spirit thereof, and it is intended therefore, that only such limitations shall be imposed thereon, as are indicated in the prior art or in the appended claims.

What is claimed is:

1. A method of making in one piece stemmed glassware having a body portion of irregular shape, said method comprising selecting a mould having the desired shape for the bowl portion and rotatably mounting the same, providing sectional moulds for the stem communicating with the bowl mould, obtaining a sufficient quantity of molten glass on a blow pipe and forming an elongation on the free end thereof, inserting the glass within the moulds, the elongated portion thereof being received in the stem mould and the other portion in the bowl mould, freely rotating the blow pipe and forming the stem and simultaneously freely rotating the bowl mould by the contacting of the glass therewith, and subsequently blowing the bowl portion of the glass in the bowl mould.

2. A combined stem moulding and body blowing device for making glassware, said device comprising a support, a sectional stem mould on said support, a cylindrical shaped shell mounted on said support in communication with the bore of said stem mould, a body mould freely rotatable in said shell and being in communication with said stem mould, ball bearing means interposed between the shell and the body mould, said body mould being provided with a channel in its periphery thereof, set screws in said shell receivable in said channel for preventing longitudinal movement of said body mould relative to said shell, and hingedly mounted sectional heads on the free ends of said body mould.

3. A method of making in one piece stemmed glassware, said method comprising selecting a mould having a desired shape for the bowl portion and rotatably mounting the same, providing a mould for the stem communicating with the bowl mould, obtaining a sufficient quantity of molten glass on a blow pipe and having an elongation on the free end thereof, inserting the glass within the moulds, the elongated portion thereof being received in the stem mould and the other portion in the bowl mould, freely rotating the blow pipe and forming the stem and simultaneously freely rotating the bowl mould by the contacting of the glass therewith, and subsequently blowing the bowl portion of the glass in the bowl mould.

LOUIE WOHINC.